United States Patent [19]

Hampton, Jr. et al.

[11] 4,115,926
[45] Sep. 26, 1978

[54] AUTOMOTIVE TOE-IN GAUGE

[75] Inventors: Robert S. Hampton, Jr., Waukegan; Leonard A. Morrison, Chicago; John W. Murphy, Waukegan; Craig E. Mountz, Libertyville, all of Ill.

[73] Assignee: Ammco Tools, Inc., North Chicago, Ill.

[21] Appl. No.: 810,294

[22] Filed: Jun. 27, 1977

[51] Int. Cl.² .............................................. G01B 11/26
[52] U.S. Cl. .................................. 33/288; 33/203.18; 356/155
[58] Field of Search ............ 33/288, 286, 287, 203.18, 33/203; 356/155, 154

[56] References Cited

U.S. PATENT DOCUMENTS

| 2,198,836 | 4/1940 | Patton | 33/286 |
| 3,029,515 | 4/1962 | Marteil | 33/288 |
| 3,953,134 | 4/1976 | Appel et al. | 33/203.18 |

Primary Examiner—William D. Martin, Jr.

[57] ABSTRACT

This invention relates generally to wheel alignment devices, and specifically to such a device in which accurate toe can be established even if the angular relationship of the device to a reference line, such as the horizontal, changes during the toeing procedure.

4 Claims, 3 Drawing Figures

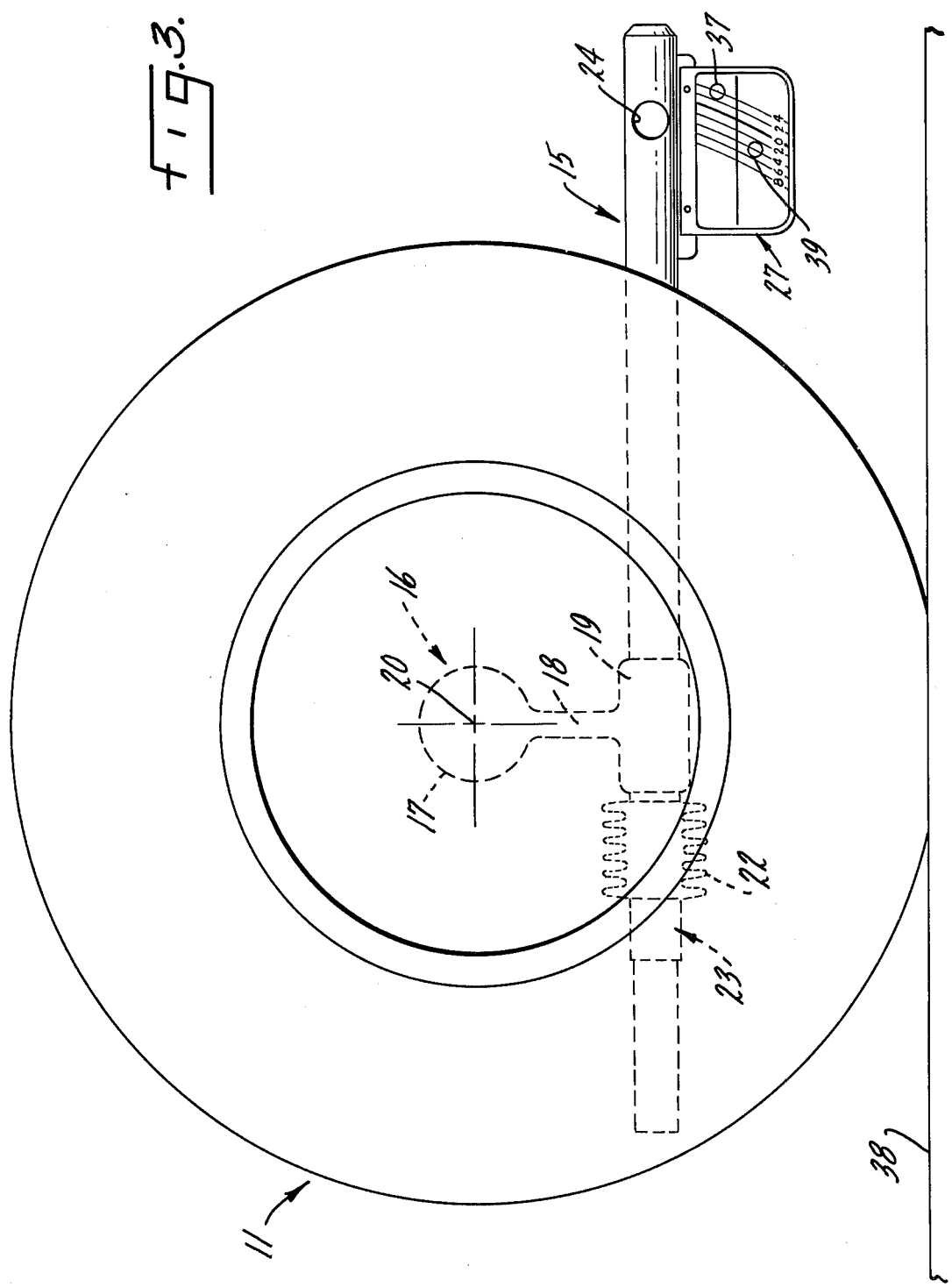

AUTOMOTIVE TOE-IN GAUGE

BACKGROUND OF THE INVENTION

The toe of the front wheel of an automotive vehicle is defined generally as the angular relationship of the principal plane of the front wheel to the vertical plane passing through the longitudinal axis of the vehicle. The provision of toe is essential to good stability and handling of the vehicle, and a proper life span of the tire carried by the wheel. A number of toe in devices have been developed for applying toe to the front wheels of automotive vehicles, but, by and large, existing devices are subject to the disadvantage of providing inaccurate results if the devices are disturbed from an initial position during the toe in adjustment procedure.

Thus, and using one currently popular type of toe alignment device as representative, the operator of the device is required to locate the device absolutely horizontal prior to toeing the wheel, and to maintain the device absolutely horizontal during the toe in procedure in order to be assured of achieving accurate results. Many such devices include a spirit level for the purpose of assuring maintenance of the toe in device in a horizontal position.

One substantial difficulty with this type of device is that, as a practical matter, it is almost a physical impossibility to maintain the alignment device absolutely horizontal during the toe in procedure.

For example, the operator must invariably strike one or more heavy blows against components in the suspension system of the vehicle in order to assure movement of the wheel into the proper, toed position. As can be readily appreciated, such blows can, and do, displace the toe in device which is attached to the wheel from its required perfectly horizontal orientation, with the result that inaccurate readings are obtained. As a consequence, the operator may believe the wheel is properly toed when the fact is it is not due to the error introduced by disturbance of the device from its original reference orientation.

SUMMARY OF THE INVENTION

Accordingly, a primary object of the invention is to provide a toe in wheel alignment device which can be attached to a wheel during the toe in procedure in the usual fashion, but which will provide accurate results even if the device is displaced from its original, reference position during the toe in procedure.

Another object is to provide a wheel alignment device as above described in which the usual spirit level, or other level gauging device, which is an integral component of many present wheel devices may be eliminated.

These objects, and others which will become apparent from the following description of the invention, are achieved by adding to the conventional target screen carried by a wheel alignment device a plurality of arcuate lines, which arcuate lines are taken about the point of connection of the wheel alignment device to the wheel whereby, so long as the point of attachment remains fixed, accurate toe readings will be obtained irrespective of the amount of displacement of the device from its initial position. Indeed, within substantial limits, the initial position of the toe in device is substantially immaterial.

BRIEF DESCRIPTION OF DRAWING

The invention is illustrated more or less diagrammatically in the accompanying drawing wherein:

FIG. 3 is an interior view, with parts in phantom, showing the relationship of the wheel alignment device of this invention to a wheel which is to be aligned during the toe in procedure.

Like reference numerals will be used to refer to like parts from Figure to Figure in the drawing.

DESCRIPTION OF PREFERRED EMBODIMENT

Figure 1:
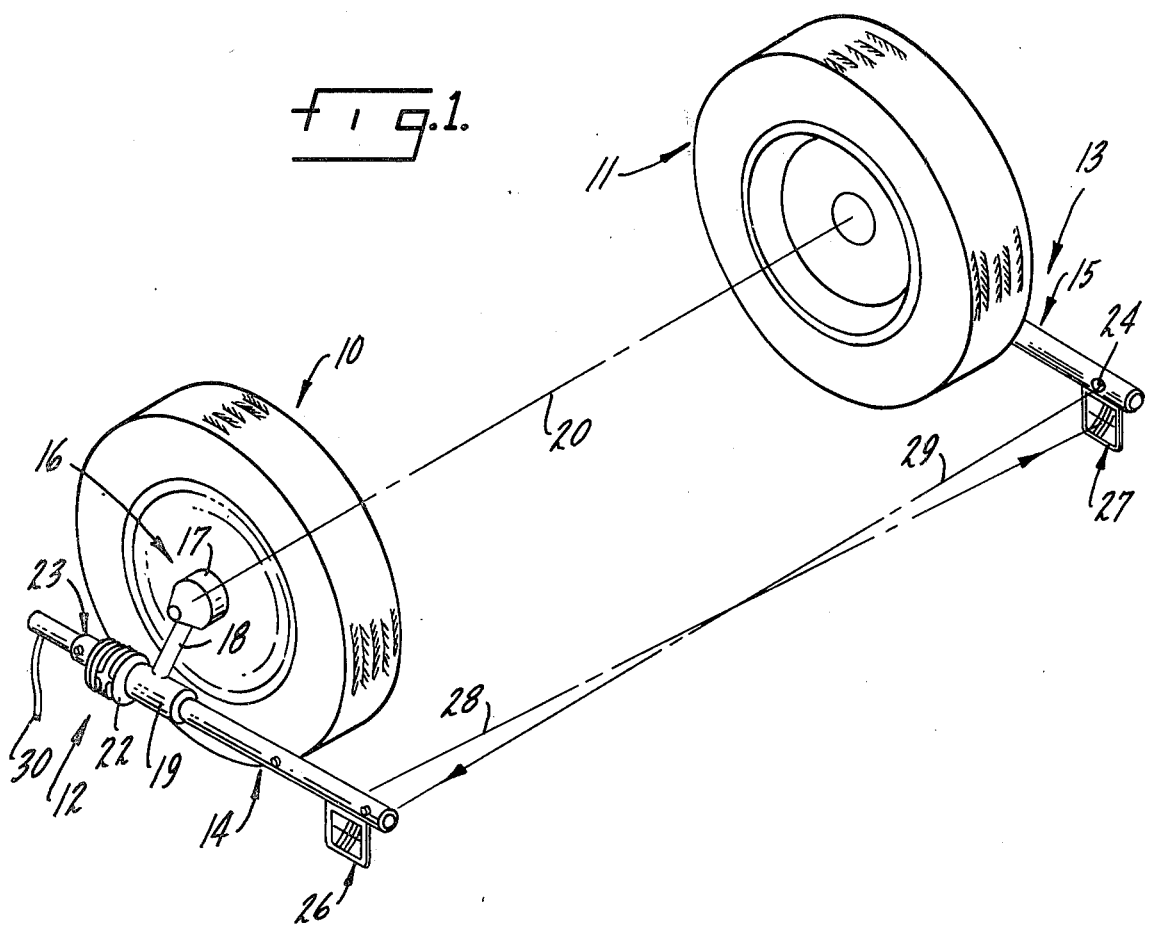
FIG. 1 is a perspective view of the wheel alignment device of the present invention.

A pair of wheels are indicated generally at 10 and 11 in FIG. 1, the wheels being part of an automotive vehicle, the balance of which is not shown for purposes of clarity. It will be understood that the wheels are to be toed. A pair of wheel alignment devices are indicated generally at 12 and 13 respectively. Wheel alignment device 12 is associated with wheel 10, sometimes hereafter referred to as the first wheel, and wheel alignment device 13 is associated with wheel 11, sometimes hereafter referred to as the second wheel. Since the wheel alignment devices are alike, a description of one will suffice for a description of both, although on occasion reference will of necessity, have to be made to both.

The wheel alignment device includes a pair of housing assemblies, indicated generally at 14 and 15, and an attachment device, indicated generally at 16, the purpose of which is to temporarily fixedly secure the housing assembly to the wheel during the toe in procedure.

In this instance the wheel attachment device means includes a magnetic mounting clamp 17, an arm 18, and a sleeve 19 in which the housing 15 is received. It will be understood that the magnetic mounting clamp 17 includes conventional structure for securely holding the device to the wheel so that the center of the magnetic mounting clamp 17 remains aligned with an extension of the wheel axis 20 throughout the toe in adjustment procedure.

The housing assembly includes a heat radiator 22 and a lamp assembly, indicated generally at 23. An aperture is indicated at 24 at the forward end of the wheel alignment device. It will be understood that the lamp assembly 23 and aperture 24 are part of a conventional optical system contained within housing 15 which functions to project a beam of light outwardly from aperture 24 in each housing assembly 15, which beam impinges against a target screen 26 or 27. The light beams, indicated generally at 28, 29 may take the form of a single shaft of light, which would be reflected as a dot on the target screen which receives it, or as a circle, which is a preferred form.

It will be understood that the optical system includes a series of lenses and mirrors, as well as electrical power source 30, the lenses and mirrors being conventional in construction and therefore not illustrated further herein. Suffice to say that light beam 28 emanates from housing assembly 14 impinges on target screen 27, and light beam 29 emanates from the housing assembly 15 for impingement on target screen 26.

Figure 2:
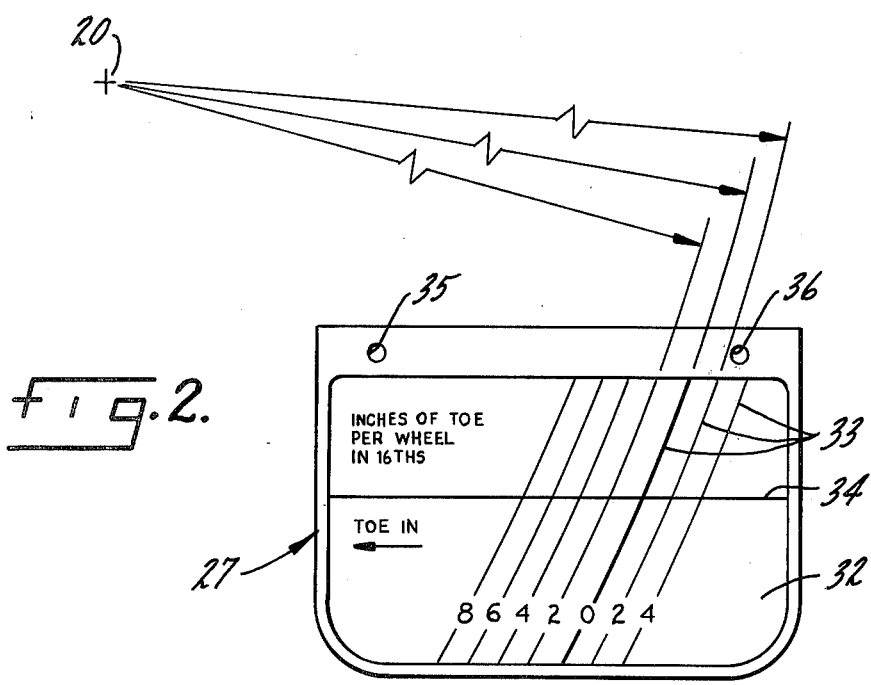
FIG. 2 is a side view of one of the target screens of the alignment device illustrated in FIG. 1.

Referring now to FIG. 2, target screen 27 is there shown to include a flat surface 32 on which are placed a series of indicia indicated generally at 33. The indicia take the form of a series of arcs, each of which is struck about a center represented by point 20 which is coincident with wheel axis 20. Near the bottom of the target screen it will be noted that the distance between each arc 33 represents a fixed unit distance which in turn represents a fixed fraction of an inch of toe of the wheel with which the alignment device is used. The target screen is connected at locations 35, 36 to the underside of its associated housing.

In operation, a wheel alignment device is temporarily fixed to a wheel by engagement of the magnetic mounting clamp 17 with the center of the wheel hub in a conventional manner. Thereafter, the wheel alignment device is activated and adjusted until it is essentially horizontal, as by, initially, activating the optical system via power source 30, and focusing the light beam emanating from each housing assembly on to the target screen carried by the opposite housing assembly.

Thereafter the operator adjusts the position of the wheel to the desired degree of toe.

Referring to FIG. 3 for example the circle, which represents light beam 28, represented by reference numeral 37 is shown to be toed in the wrong direction. After suitable adjustment the operator may change the position of wheel 11, with respect to the ground or reference surface 38 so that light beam 39 is now located at the proper degree of toe which, in this instance has been selected as four-sixteenths of an inch.

It will be noted that with respect to both circle 37 and circle 39, no adjustment need be made to ensure that the circles are projected properly; the only requirement is that the displacement of wheel 11 be not so great that the light beam circle 37 or 39 falls off target screen 27.

The degree of error that is inherent in a system in which the arcs 33 are replaced by a series of vertical lines can be seen by projecting the end of any arcuate line onto reference line 34. The distance between (a) the intersection of the projection with reference line 34, and (b) the point at which the point crosses reference line 34, can represent several one-sixteenths of an inch of error in the toe alignment.

It will thus be noted that it is not essential for the wheel alignment operator to readjust housing assemblies 14 and 15 to an exactly horizontal orientation after every physical movement of either or both of wheels 10 and 11; it is only essential that the wheel alignment devices be located in such position that the light beams 28 and 29 which emanate from housing assembly 14 and 15 respectively are received in the receiving surface represented by the operative portion of target screens 26 and 27.

Although a preferred embodiment of the invention has been illustrated and described, it will at once be apparent to those skilled in the art that modifications and betterments of the invention may be made within the spirit and scope of the inventive concept. It is intended therefore that the scope of the invention be limited not by the scope of the foregoing exemplary description but, rather, by the scope of the hereinafter appended claims when interpreted in light of the pertinent prior art.

We claim:

1. For use in a wheel alignment system, the combination of
    a first housing assembly,
    means for temporarily fixedly connecting said first housing assembly to a first wheel which is to be aligned,
    said first housing assembly having an optical system which includes means for generating a light beam emanating from said first housing assembly for reception on a target screen carried by a similar, oppositely positioned second housing assembly associated with a second wheel which is located axially opposite said first wheel, and
    a target screen carried by said first housing assembly for receiving a light beam emanating from means for generating a light beam emanating from said second housing assembly,
    means for eliminating the effect of physical displacement of a housing assembly from an initial line of reference, such as the horizontal, due to forces applied to the wheel with which it is associated during the alignment procedure,
    said displacement elimination means comprising a plurality of visible indicia on said target screen carried by said first housing assembly,
    each indicia being an arc struck about the point of connection of said first housing assembly to its associated first wheel as a center,
    whereby a true reading may be obtained irrespective of the displacement of said first housing assembly from an initial line of reference as by movement of said first wheel during the alignment procedure, and consequent movement of said first housing assembly therewith.

2. The combination of claim 1 further characterized by and including
    means for temporarily fixedly connecting said first housing assembly to said first wheel includes
    magnetic means for affixing the first housing assembly to said first wheel.

3. The combination of claim 1 further characterized in that
    said target screen also includes a reference line which intersects each arc.

4. The combination of claim 1 further characterized in that
    said arcs are calibrated in a fixed unit of distance, which distance corresponds to a fixed unit of toe in of the wheel associated with the housing assembly from which the light beam emanates.

* * * * *